United States Patent
Mauro et al.

(10) Patent No.: US 10,282,989 B2
(45) Date of Patent: May 7, 2019

(54) METHOD AND DEVICE FOR CONTROLLING A TRANSMISSION BEHAVIOR FOR TRANSMITTING A WARNING MESSAGE FOR A VEHICLE

(71) Applicant: Robert Bosch GmbH, Stuttgart (DE)

(72) Inventors: Daniele Mauro, Bad Urach (DE); Kurt Eckert, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/742,921

(22) PCT Filed: May 25, 2016

(86) PCT No.: PCT/EP2016/061837
§ 371 (c)(1),
(2) Date: Jan. 9, 2018

(87) PCT Pub. No.: WO2017/012755
PCT Pub. Date: Jan. 26, 2017

(65) Prior Publication Data
US 2018/0218599 A1    Aug. 2, 2018

(30) Foreign Application Priority Data
Jul. 17, 2015  (DE) .......................... 10 2015 213 483

(51) Int. Cl.
*G08G 1/16* (2006.01)
*B60W 50/14* (2012.01)
(Continued)

(52) U.S. Cl.
CPC ......... *G08G 1/09675* (2013.01); *B60W 50/14* (2013.01); *G08G 1/09623* (2013.01);
(Continued)

(58) Field of Classification Search
USPC ................................ 340/539.1, 903; 706/46
See application file for complete search history.

(56) References Cited

U.S. PATENT DOCUMENTS

2010/0287222 A1* 11/2010 Wright ................ H04L 41/0226
707/803
2011/0181408 A1* 7/2011 Greenis .................. G08B 27/00
340/539.1
(Continued)

FOREIGN PATENT DOCUMENTS

| DE | 102011009601 A1 | 8/2012 |
|---|---|---|
| DE | 102012102693 A1 | 10/2013 |
| EP | 2477041 A1 | 7/2012 |

OTHER PUBLICATIONS

International Search Report dated Sep. 9, 2016, of the corresponding International Application PCT/EP2016/061837 filed May 25, 2016.

*Primary Examiner* — Fekadeselassie Girma
(74) *Attorney, Agent, or Firm* — Norton Rose Fulbright US LLP; Gerard Messina

(57) ABSTRACT

A method for controlling a transmission behavior for transmitting a warning message for a vehicle. In this case, a warning message for warning a driver of the vehicle about a hazardous situation is initially read in. Furthermore, a piece of context information about a context in which the warning message was generated is received. In a further method step, a control signal for controlling a transmission of the warning message via a communication interface of the vehicle and/or a vehicle-external data server connected to the communication interface is provided as a function of the piece of context information.

8 Claims, 1 Drawing Sheet

(51) Int. Cl.
*G08G 1/0962* (2006.01)
*G08G 1/0967* (2006.01)

(52) U.S. Cl.
CPC . *G08G 1/096716* (2013.01); *G08G 1/096741* (2013.01); *G08G 1/096775* (2013.01); *G08G 1/096783* (2013.01); *G08G 1/164* (2013.01); *B60W 2550/40* (2013.01); *G08G 1/161* (2013.01)

(56) References Cited

U.S. PATENT DOCUMENTS

| | | | |
|---|---|---|---|
| 2012/0268306 A1 | 10/2012 | Coburn et al. | |
| 2015/0274072 A1* | 10/2015 | Croteau | E21F 11/00 340/903 |
| 2015/0363694 A1* | 12/2015 | Banerjee | H04L 67/306 706/46 |
| 2017/0120816 A1* | 5/2017 | Croteau | E21F 11/00 |
| 2017/0188861 A1* | 7/2017 | Schreck | A61B 5/0002 |
| 2018/0151055 A1* | 5/2018 | Prokofyeva | G08B 27/00 |
| 2018/0278618 A1* | 9/2018 | McCarty | H04L 63/0861 |
| 2018/0288570 A1* | 10/2018 | Bakshi | H04W 4/023 |

\* cited by examiner

METHOD AND DEVICE FOR CONTROLLING A TRANSMISSION BEHAVIOR FOR TRANSMITTING A WARNING MESSAGE FOR A VEHICLE

FIELD

The present invention relates to a device and a method for controlling a transmission behavior for transmitting a warning message for a vehicle. The present invention also relates to a computer program.

BACKGROUND INFORMATION

Wrong-way drivers may cause fatalities, injuries, and substantial property damage in case of an accident. Over 50% of wrong-way drivers begin on junctions to federal highways. Here in particular, accidents at higher collision velocity may occur, and therefore frequently result in severe or fatal injuries To reduce the data load during the transmission of warning messages with respect to such wrong-way drivers, for example, the load of one or more transmission channels may be monitored by an end-user, the data being able to be transmitted at reduced data rate or reduced power if this channel load exceeds a limiting value.

Furthermore, in one conventional method, the load in radio transmission systems may be monitored by network monitoring systems such as mobile radio base stations and assigned transmission capabilities may be controlled.

SUMMARY

In accordance with an example embodiment of the present invention, a method for controlling a transmission behavior for transmitting a warning message for a vehicle, furthermore a device which uses this method, and finally a corresponding computer program are provided. Advantageous refinements of and improvements on the device in accordance with the present invention are possible by way of the measures described herein.

A method for controlling a transmission behavior for transmitting a warning message for a vehicle is provided, the method including the following steps:
reading in a warning message for warning a driver of the vehicle of a hazardous situation;
receiving or generating a piece of context information about a context in which the warning message was generated; and
providing a control signal for controlling a transmission of the warning message via a communication interface of the vehicle and/or a vehicle-external data server connected to the communication interface as a function of the context information.

A hazardous situation may be understood as a traffic situation in which traffic safety of the vehicle or other road users, for example, an oncoming vehicle, is affected in such a way that there is an increased risk of accident. The context may be, for example, a present velocity of the vehicle, a relative velocity between the vehicle and other vehicles adjacent to the vehicle or approaching the vehicle, a piece of information about a present route course, which only applies temporarily under certain circumstances, of a route traveled by the vehicle, such as a highway on-ramp, or a piece of information about a special status of vehicles approaching the vehicle. According to different specific embodiments, the piece of context information may be generated inside the vehicle, for example, by a device for implementing the method or a further unit inside the vehicle or by a unit situated externally to the vehicle. Accordingly, according to different specific embodiments, the piece of context information may be received by a device for implementing the method or by the vehicle via a suitable interface. The communication interface may be a radio interface for transmitting or receiving the warning message in the form of a radio signal. The communication interface may be used for exchanging pieces of information between the vehicle and the data server and between the vehicle and at least one further vehicle, in particular a further vehicle affected by the context. A data server may be understood as a backend for storing, processing, and transmitting vehicle-relevant data, in particular the warning message, but also sensor data acquired by the vehicle and provided via the communication interface. The data server may be, for example, a central component of a comprehensive communication network made up of the vehicle and a plurality of other vehicles.

The control signal may be provided to either control an initial transmission of the warning message or a retransmission, i.e., a relay of the warning message.

Depending on the specific embodiment, the warning message may be generated, for example, by the vehicle, the data server, or at least one other vehicle connected via the communication interface or the data server to the vehicle or the data server.

If the warning message is generated by the vehicle or the vehicle receives the warning message from the other vehicle or the data server, the vehicle may generate the piece of context information in response to the generation or reception of the warning message and, using the piece of context information, may control a transmission or retransmissions of the warning message via the communication interface, a communication interface of the other vehicle, or the data server, for example, to suppress the transmission or retransmission of the warning message.

If the warning message is generated by the data server, for example, using the sensor data provided by the vehicle via the communication interface, or the data server receives the warning message from the vehicle or at least one further vehicle located in the same context as the vehicle, the data server may also generate the piece of context information in response to the generation or reception of the warning message and, using the piece of context information, may control the transmission of the warning message via the communication interface of the vehicle or the further vehicle accordingly.

For example, the control signal may be provided to control, additionally or alternatively to the transmission of the warning message, an initial or retransmission of sensor data, which are required for generating the warning message and are provided by the vehicle via the communication interface, for example, LIDAR, radar, ultrasonic, camera, or car-to-X signals.

The approach described here is based on the finding that it is possible to significantly reduce a data load during the transmission of warning messages, for example, wrong-way driver warnings, by controlling the transmission thereof by taking into consideration a context in which the warning messages were each generated. By way of a corresponding method, the transmission may be optimized, for example, in such a way that the transmission of irrelevant warning messages is avoided and a power consumption linked to the transmission or a consumption of communication resources is reduced accordingly.

In such a method for intelligent reduction of the propagation of warning messages, the decision on the reduction of the transmission of pieces of information may be carried out, for example, by the use of pieces of context information during the generation of the message. This has the advantage that by way of such a use of an overall context, a decision may be made system-wide about whether messages are to be transmitted or not.

It is therefore possible to avoid reducing the data load in a blanket manner and independently of a particular situation and a particular state of a transmitting vehicle and its surroundings or solely on the basis of state differences during the transmission of regular messages, so-called beacons. By taking into consideration the overall context and a precise knowledge of the actual function of a message to be transmitted, according to the approach provided here, for example, targeted and therefore efficient suppression of the transmission of messages may be carried out. The data load on a particular radio channel used may thus be reduced, by which in turn the probability of an overload decreases and the costs resulting in the event of a message transmission may also be reduced.

By way of such a use of the overall context, it may be ensured in a targeted manner that a functionality on which the message transmission is based is not impaired or is only impaired to a very minor extent. In addition, it is possible with the aid of the approach provided here, for example, to prevent the transmission of messages in specific cases in which a transmission in a present context could result in confusion of the warned driver being confused, which may reduce the number of incorrect warnings and may improve the overall quality of the function.

According to one specific embodiment, in the step of providing, the control signal may be provided to suppress the transmission if the piece of context information indicates at least a temporary reversal or mitigation of the hazardous situation. Warning messages which are obsolete or cause confusion under certain circumstances may thus be prevented from being transmitted.

It is furthermore advantageous if, in the step of providing, the control signal is provided to furthermore control a transmission of data, which relate to the hazardous situation, of a surroundings sensor of the vehicle via the communication interface and, additionally or alternatively, the data server. A surroundings sensor may be understood, for example, as a radar, LIDAR, ultrasonic, or car-to-X sensor, or a camera. A quantity of data arising during the transmission of data between the communication interface and the data server may be reduced further by this specific embodiment.

According to another specific embodiment, the warning message may be generated either by the vehicle or the data server or by both. In a corresponding manner, additionally or alternatively, the piece of context information may also be generated by the vehicle or the data server. The reliability of the method may thus be increased.

It is additionally advantageous if, in the step of providing, the control signal is provided to furthermore control the transmission of the warning message via a further communication interface, which is connected to the communication interface or the data server or both, of at least one further vehicle. The data load in a communication network made up of multiple vehicles may thus be reduced. In particular, the vehicle and the further vehicle may be located in the same context with respect to the warning message. For example, both vehicles may be located on the same highway on-ramp.

Furthermore, in the step of providing, the control signal may be provided to furthermore control a playback of the warning message to the driver. The control signal may be used, for example, to suppress the playback if the piece of context information indicates that the warning message is obsolete. It is thus possible to prevent the attention of the driver from being distracted from a present traffic situation by warning messages which are no longer relevant.

It is also advantageous if the piece of context information represents a velocity of the vehicle. Additionally or alternatively, the piece of context information, depending on the specific embodiment, may include a piece of information about a route signage of a route traveled by the vehicle or an item of information about a status of at least one vehicle approaching the vehicle. With the aid of the status, for example, it is possible to differentiate between conventional road users and road users having special status such as emergency vehicles. The context in which the warning message was generated may be ascertained reliably by this specific embodiment.

This method may be implemented, for example, in software or hardware or in a mixed form of software and hardware, for example, in a control unit.

The approach provided here furthermore provides a device which is designed to carry out, control, and implement the steps of a variant of the method provided here in corresponding units. The object on which the present invention is based may also be achieved rapidly and efficiently by this embodiment variant of the present invention in the form of a device.

A device may be understood in the present case as an electrical device which processes sensor signals and outputs control and/or data signals as a function thereof. The device may include an interface, which may be designed as hardware and/or software. In the case of a hardware design, the interfaces may be, for example, part of a so-called system ASIC, which contains greatly varying functions of the device. However, it is also possible that the interfaces are separate integrated circuits or are at least partially made up of discrete components. In the case of a software design, the interfaces may be software modules which are provided, for example, on a microcontroller in addition to other software modules.

A computer program product or computer program is also advantageous, having program code, which may be stored on a machine-readable carrier or storage medium such as a semiconductor memory, a hard drive memory, or an optical memory and is used to carry out, implement, and/or control the steps of the method according to one of the above-described specific embodiments, in particular if the program product or program is carried out on a computer or a device.

Exemplary embodiments of the present invention are illustrated in the figures and explained in greater detail below.

DETAILED DESCRIPTION OF EXAMPLE EMBODIMENTS

Figure 1:
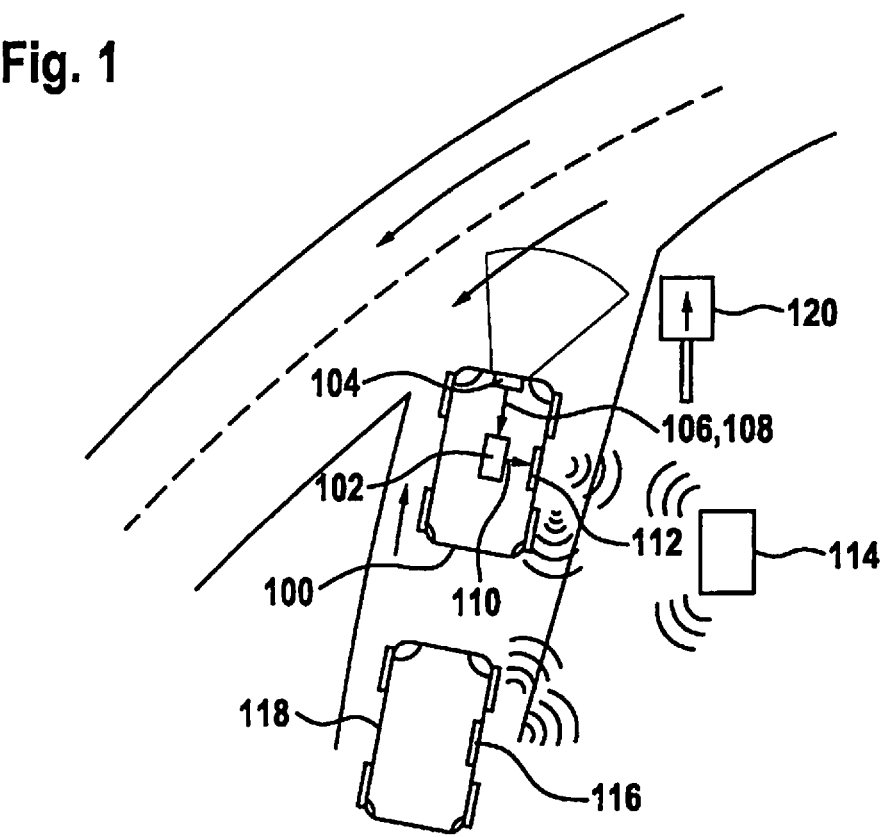
FIG. 1 shows a schematic view of a vehicle including a device according to one exemplary embodiment.

In the description below of preferred exemplary embodiments of the present invention, identical or similar reference numerals are used for the elements that are shown in the various figures and act similarly, a repeated description of these elements being omitted.

FIG. 1 shows a schematic view of a vehicle 100 including a device 102 according to one exemplary embodiment. By way of example, vehicle 100 is located on an on-ramp to a highway, the travel direction of which is opposite to a present travel direction of vehicle 100. The travel directions are marked by corresponding arrows. Vehicle 100 is equipped with a surroundings recognition unit 104, which, according to this exemplary embodiment, recognizes the hazardous situation shown in FIG. 1 and generates a corresponding warning message 106 for warning a driver of vehicle 100. At the same time, surroundings recognition unit 104 generates a piece of context information 108 about a context in which warning message 106 was generated. Device 102 is designed to read in both warning message 106 and piece of context information 108 and, as a function of the context represented by piece of context information 108, to provide a control signal 110 for controlling a transmission of the warning message via a communication interface 112 of vehicle 100, a radio interface here.

According to the exemplary embodiment shown in FIG. 1, communication interface 112 is connected via a radio link to a data server 114, which is situated outside vehicle 100, for receiving, transmitting, and processing vehicle-relevant data, for example, warning messages or sensor data. Control signal 110 is used either to control the transmission of warning message 106 via communication interface 112, in particular to suppress it if the context indicates that the warning message deviates significantly from an actual situation of vehicle 100, or to control a further transmission of warning message 106 via data server 114 to further road users in a corresponding manner. For example, data server 114 is connected for this purpose via the radio link to a further communication interface 116 of a further vehicle 118, which follows vehicle 100 in FIG. 1, for example. The two vehicles 100, 118 are therefore located in the same context.

According to one exemplary embodiment, surroundings recognition unit 104 is designed to recognize a route signage 120, symbolically shown in FIG. 1 in the form of a road sign located on the roadway edge of the on-ramp, and to generate context information 108 on the basis of recognized route signage 120. For example, context information 108 according to FIG. 1 indicates that traveling on the on-ramp in a travel direction opposite to the travel direction of the highway is temporarily permitted. Accordingly, device 102 provides control signal 110 using context information 108 to suppress the transmission of warning message 106 previously generated by surroundings recognition unit 104, so that further distribution of warning message 106 via communication interface 112 or data server 114 is prevented.

It is also possible that warning message 106 is generated by data server 114 instead of by surroundings recognition unit 104. For this purpose, data server 114 receives, for example, the surroundings sensor data gathered by surroundings recognition unit 104 with respect to the hazardous situation shown in FIG. 1 as the base input data for generating warning message 106. Data server 114 accordingly also generates pieces of context information 108 during the generation of warning message 106 and, using pieces of context information 108, control signal 110, which is used in this case to control a transmission of warning message 106 via the radio link to communication interface 112 or to further communication interface 116.

According to another exemplary embodiment, vehicle 100 is designed to recognize a hazardous situation or record basic pieces of information with respect thereto by surroundings observation with the aid of various sensors such as radar, LIDAR, ultrasonic, camera, or car-to-X sensors and to transmit this information to other road users in the zone of influence of the hazard, such as further vehicle 118, via suitable communication media. This message transmission takes place directly or indirectly via data server 114, which functions as a backend, and which is used either as a simple reflector for distributing the messages without modification of the pieces of information or for refining the messages. In the latter case, data server 114 is a component or core of a hazard recognition system, which also includes vehicle 100 or further vehicle 118, depending on the specific embodiment.

During the generation of warning message 106 in vehicle 100 or in data server 114, additional pieces of information about the context in which warning message 106 was generated are used to decide whether a transmission of warning message 106 is required or not. In this case, the transmission of the sensor data provided by surroundings recognition unit 104 as base input data may also be suppressed depending on the context, which may once again contribute decisively to the data reduction.

Figure 2:
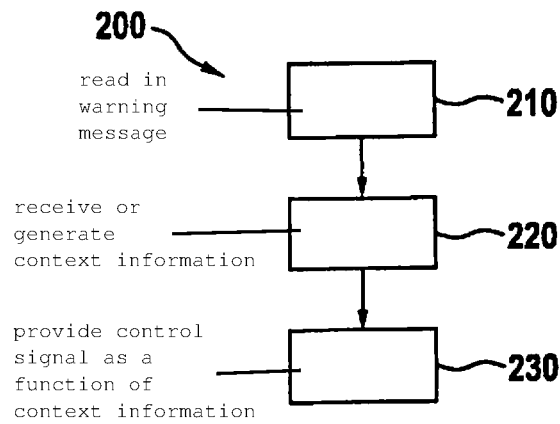
FIG. 2 shows a flow chart of a method according to one exemplary embodiment.

FIG. 2 shows a flow chart of an exemplary embodiment of a method 200 for controlling a transmission behavior for transmitting a warning message for a vehicle. Method 200 may be carried out or controlled, for example, by a device described above on the basis of FIG. 1. In a step 210, a warning message is initially read in. The warning message is used to warn a driver of the vehicle of a potentially hazardous situation, for example, traveling on a highway on-ramp in a non-permitted direction. Furthermore, in a step 220, a piece of context information about a context in which the warning message was generated is received or generated. Depending on the specific embodiment, the context information may be generated by the vehicle itself, more precisely by a surroundings recognition unit of the vehicle, by a vehicle-external data server which is connected to the vehicle via a communication interface of the vehicle, or by a further vehicle, which is either directly connected to the vehicle or is indirectly connected to the vehicle via the data server. In a third step 230, as a function of a content of the context information, a control signal is provided for controlling a transmission of the warning message via the communication interface or the data server. The control signal is used, for example, to suppress an initial or repeated transmission of the warning message, if the context information represents a temporary reversal or at least a mitigation of the potentially hazardous situation indicated by the warning message.

Steps 210, 220, 230 may be carried out continuously, for example, during operation of the vehicle. The context information may be received in response to the reading in of the warning message.

Method 200 may be carried out, for example, in conjunction with the generation of a wrong-way driver warning. Depending on the specific embodiment, however, method 200 may also be used in conjunction with other types of warning messages, if expedient and proper pieces of context information are present in this case.

For example, a vehicle sensor system of a vehicle potentially driving the wrong way recognizes traveling on a road on-ramp, such as a highway on-ramp, in the wrong direction, by video detection of on-ramp warning signs or by evaluating movement trajectories of the vehicle. In this case, the base data generated by the vehicle sensors for hazard recognition may additionally be transmitted to the data server.

The vehicle transmits this information to the data server, directly to vehicles in the surroundings, or both to the data server and directly to the vehicles in the surroundings. Optionally, the data server may check the information for plausibility and refine it, for example, using pieces of map information, and relay the warning message. It is also conceivable that the vehicle transmits the pieces of information recorded by the sensors to the data server and the actual warning message is only generated in the data server and distributed from there.

The transmission of the base information or the warning message in the vehicle or on the server is suppressed by additional pieces of context information, which are present in the vehicle or also on the data server. The transmission may be suppressed, for example, in the following contexts:

The vehicle transmitting the base information or the warning vehicle is no longer moving or is only moving very slowly. This is the case, for example, in a traffic jam situation.

The highway on-ramp was temporarily cleared in the wrong direction. This may be the case, for example, if a traffic jam is to be broken up in the event of blockage of the highway.

The on-ramp is only temporarily open.

In the case of a vehicle approaching the vehicle, it is a vehicle having special status, such as an emergency vehicle in operation.

According to one exemplary embodiment, method 200 is carried out to reduce or prevent the transmission of warning messages depending on the context in which each of the warning messages were generated.

In this case, the context may be recognized by a warning vehicle, for example, which suppresses its own transmission of the warning message or of pieces of base information required for generating the warning message.

Additionally or alternatively, a data server in the backend recognizes the context, the data server suppressing a transmission of the warning message or suppressing a transmission of pieces of base information by vehicles which are affected by the recognized context.

A further possibility is that a warned vehicle recognizes the context and suppresses a playback of the warning message. In this case, the warned vehicle may suppress a further transmission of the warning message or of pieces of base information required for generating the warning message by feedback to an original transmitter of the warning message.

If an exemplary embodiment includes an "and/or" linkage between a first feature and a second feature, this is to be read in such a way that the exemplary embodiment, according to one specific embodiment, includes both the first feature and the second feature and, according to another specific embodiment, includes either only the first feature or only the second feature.

What is claimed is:

1. A method for controlling a transmission behavior for transmitting a warning message for a vehicle, the method comprising:
   reading in a warning message for warning a driver of the vehicle about a hazardous situation, which is ascertained by a surroundings recognition unit;
   receiving or generating a piece of context information, which is generated by a surroundings recognition unit, about a context in which the warning message was generated; and
   providing, as a function of the context information, a control signal for controlling a transmission of the warning message via a communication interface of the vehicle, and a vehicle-external data server connected to the communication interface;
   wherein the surroundings recognition unit is configured to recognize a route signage in the form of a road sign, and to generate the context information based on a recognition of the route signage, and
   wherein, in the providing, the control signal is provided to suppress the transmission when the piece of context information indicates at least a temporary reversal or mitigation of the hazardous situation.

2. The method as recited in claim 1, wherein, in the providing, the control signal is provided to further control a transmission of data, which are related to the hazardous situation, of a surroundings sensor of at least one of (i) the vehicle via the communication interface, and (ii) the data server.

3. The method as recited in claim 1, wherein at least one of the warning message and the piece of context information, is generated by at least one of the vehicle and the data server.

4. The method as recited in claim 1, wherein, in the providing, the control signal is provided to further control the transmission of the warning message via a further communication interface, which is connected to at least one of a communication interface and a data server, of at least one further vehicle.

5. The method as recited in claim 1, wherein, in the providing, the control signal is provided to furthermore control a playback of the warning message to the driver.

6. The method as recited in claim 1, wherein the piece of context information at least one of: (i) represents a velocity of the vehicle, (ii) includes a piece of information about the route signage of a route traveled by the vehicle, and (iii) includes a piece of information about a status of at least one vehicle approaching the vehicle.

7. A device for controlling a transmission behavior for transmitting a warning message for a vehicle, comprising:
   a controlling device configured to perform the following:
   reading in a warning message for warning a driver of the vehicle about a hazardous situation;
   receiving or generating a piece of context information about a context in which the warning message was generated; and
   providing, as a function of the context information, a control signal for controlling a transmission of the warning message via at least one of: (i) a communication interface of the vehicle, and (ii) a vehicle-external data server connected to the communication interface;
   wherein the surroundings recognition unit is configured to recognize a route signage in the form of a road sign, and to generate the context information based on a recognition of the route signage, and
   wherein, in the providing, the control signal is provided to suppress the transmission when the piece of context information indicates at least a temporary reversal or mitigation of the hazardous situation.

8. A non-transitory machine-readable storage medium on which is stored a computer program, which is executable by a processor, comprising:
   a program code arrangement having program code for controlling a transmission behavior for transmitting a warning message for a vehicle, the computer program, by performing the following:
   reading in a warning message for warning a driver of the vehicle about a hazardous situation;

receiving or generating a piece of context information about a context in which the warning message was generated; and providing, as a function of the context information, a control signal for controlling a transmission of the warning message via at least one of: (i) a communication interface of the vehicle, and (ii) a vehicle-external data server connected to the communication interface;

wherein the surroundings recognition unit is configured to recognize a route signage in the form of a road sign, and to generate the context information based on a recognition of the route signage, and wherein, in the providing, the control signal is provided to suppress the transmission when the piece of context information indicates at least a temporary reversal or mitigation of the hazardous situation.

* * * * *